May 15, 1945.    B. F. W. HEYER    2,376,056
BATTERY CHARGING THERMOSTAT
Filed Aug. 17, 1942    2 Sheets-Sheet 1
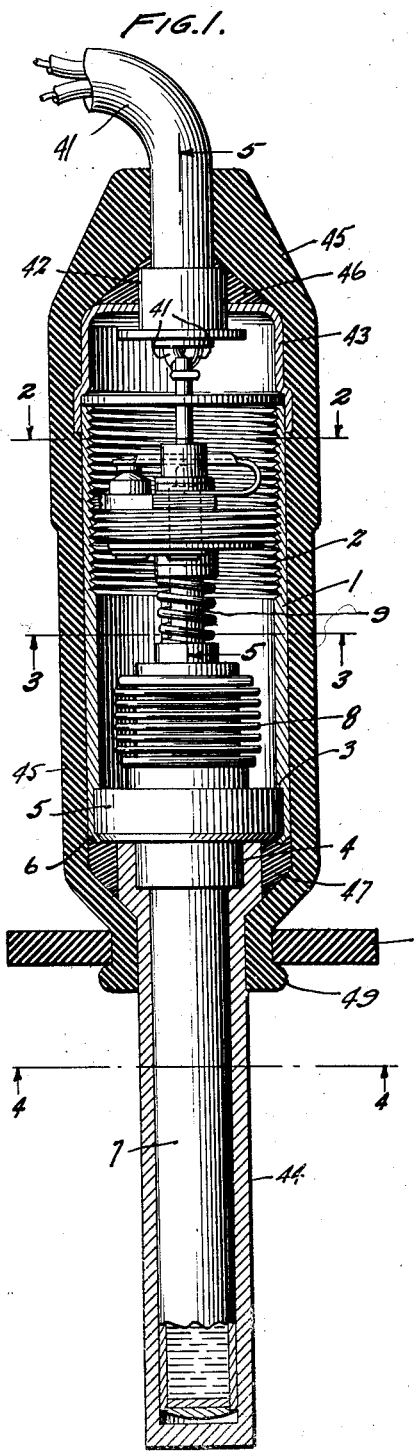
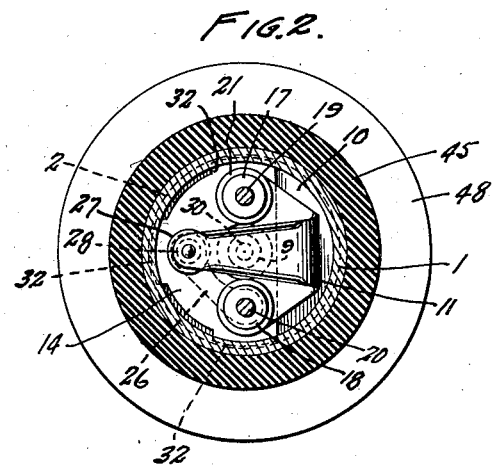
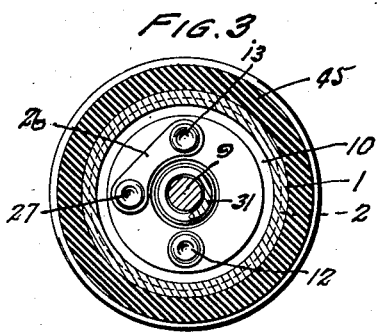
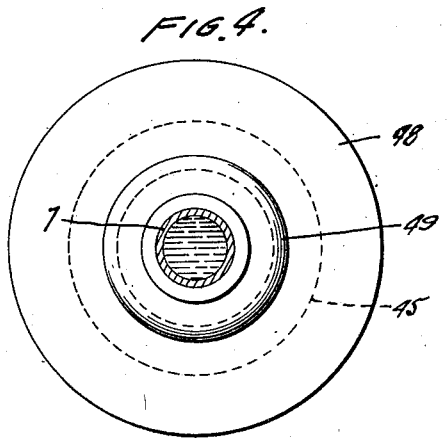
Inventor
BENJAMIN F. W. HEYER
By Semmes, Keegin, Beale & Semmes
Attorneys May 15, 1945.   B. F. W. HEYER   2,376,056
BATTERY CHARGING THERMOSTAT
Filed Aug. 17, 1942   2 Sheets-Sheet 2

Inventor
BENJAMIN F. W. HEYER
By Semmes, Keegin, Beale & Semmes
Attorneys

Patented May 15, 1945

2,376,056

UNITED STATES PATENT OFFICE 2,376,056

BATTERY CHARGING THERMOSTAT

Benjamin F. W. Heyer, Tenafly, N. J.

Application August 17, 1942, Serial No. 455,113

13 Claims. (Cl. 177—311)

This invention relates to thermostatically actuated switches, and more particularly has reference to a switch of this type constructed for insertion in the electrolyte of a battery while being charged.

In the use of so-called fast charges for charging batteries, it is essential to prevent overheating of the batteries due to the high current passing therethrough. Obviously, the best indication of the temperature of the battery being charged is the temperature of the electrolyte as this is in immediate contact with the plates, and the temperature thereof will correspond to the temperature of the essential elements of the battery.

It is also important that the battery be charged as much as possible up to the temperature limit above which damage to the battery will result, without exceeding such limit. Consequently, any thermostatic control device must be very accurate so as to obtain the maximum charge and yet avoid damage to the battery. Thermostats heretofore constructed for this purpose have not been as accurate as is desired and up until the present there has been no device available for accomplishing the exact control of the charging current relative to the battery temperature to enable the maximum charging of a battery up to the critical temperature of the battery.

An object of this invention is to provide a thermostatic switch for controlling the charging of a battery which will avoid the disadvantages of the prior art.

Another object of this invention is to provide a thermostatic switch for controlling the charging of batteries which is adapted to be immersed in the electrolyte of the battery and is highly sensitive to temperature changes to enable the maximum charge to be introduced into the battery without exceeding predetermined temperature limits.

A further object of this invention is to provide a thermostatically actuated switch which can be easily and accurately adjusted for operation at predetermined temperatures and will maintain such adjustment.

Still another object of this invention is to provide a thermostatically controlled switch which comprises a housing having a thermostat mounted on one end thereof and provided with a bulb for immersion in the electrolyte of a battery to be charged, a switch actuated by said thermostat and enclosed within said housing, said bulb being encased in an acid resisting heat conductive sheath and said housing being encased in a rubber sheath sealed to the heat conducting sheath and to said housing.

A still further object of this invention is to provide a tool for adjusting a thermostatic switch constructed in accordance with the present invention and equipped with means for indicating when a proper adjustment has been obtained.

The present invention also has for an object a thermostatically controlled switch for use in battery charging which comprises a housing having an interiorly threaded portion, a support adjustably enthreaded in said housing and carrying a switch mechanism, a thermostat mounted in said housing and having a movable member for actuating said switch, and means for adjusting the position of said support axially within said housing relatively to the movable member of the thermostat.

With these and other objects in view, the present invention resides in the parts and combinations hereinafter illustrated and described.

To facilitate an understanding of the present invention an embodiment thereof has been illustrated in the accompanying drawings in which:

Figure 1 is a longitudinal sectional view of a thermostatic switch constructed in accordance with the present invention.

Figure 2 is a sectional view taken on line 2—2 of Figure 1.

Figure 3 is a sectional view taken on line 3—3 of Figure 1.

Figure 4 is a sectional view taken on line 4—4 of Figure 1.

Figure 5:
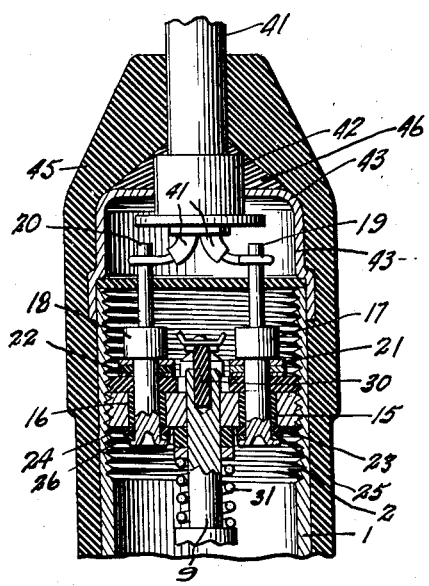
Figure 5 is a fragmentary sectional view taken on line 5—5 of Figure 1.
Figure 6:
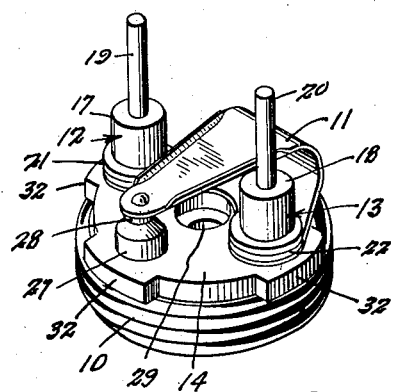
Figure 6 is a perspective view of the switch support embodied in the present invention.

A thermostatic switch embodying the principles of the present invention as illustrated in the drawings comprises a housing 1 which is in the form of a tube of steel or other suitable material having a portion of the interior surface thereof adjacent one end provided with screw threads 2. The other end of the tubular housing is bored out to form a shoulder 3 which serves as a seat for a thermostat to be mounted therein.

It is essential to the present invention that the thermostat be fixedly mounted within the housing 1 and for this purpose the thermostat is provided with a body portion 4 having a circumferential flange 5 which is adapted to be seated on the shoulder 3 within the lower end of the tubular housing 1. In order to effectively retain the flange 5 against the shoulder 3, the lower end of the tubular housing 1 is turned over as indicated by reference character 6. This construction serves to rigidly mount the thermostat relative to the housing 1.

Extending from the lower end of the housing 1 is the bulb 7 of the thermostat which is adapted to be immersed in a liquid such as the electrolyte of a battery the temperature of which is to affect the thermostat. Bulb 7 may be filled with turpentine or other suitable material which has an expansion coefficient suitable for the purpose. The upper end of the thermostat comprises a bellows 8 to the free end of which is secured a movable member in the form of a pusher rod 9. Upon expansion of the liquid within the bulb 7, the bellows is caused to expand and in turn the movable member 9 is displaced axially of the housing 1.

Positioned in the upper end of the housing 1 is a cylindrical body or disc 10 of steel or other suitable material the outer circumference of which is threaded to cooperate with the threads 2 in the housing 1. Mounted on the support disc 10 is a switch in the form of a contact spring element 11 which is secured to the disc by means of studs 12 and 13. A disc or plate of insulating material 14 is interposed between the body 10 and the spring 11. The studs 12 and 13 are insulated from the disc 10 by means of sleeves 15 and 16 of insulating material so that there is no electrical contact between the studs 12 and 13 and the disc 10. Studs 12 and 13 are provided with heads 17 and 18 of enlarged diameter from which extend the terminal posts 19 and 20. Interposed between the head 17 and the disc 14 is the fixed end of spring 11 and a pair of metal washers 21 to insure a conductive connection between spring 11 and the head 17. The opening in the fixed end of spring 11 through which the stud 13 extends is of a diameter larger than that of the stud and may be filled with a ring of insulation to insulate the spring 11 from stud 13. An insulating disc or washer 22 lies directly on spring 11 and serves to insulate spring 11 from the head 18 and any intervening metal washers.

On the under side of the body 10, washers of insulation 23 and 24 are mounted on studs 12 and 13. A metal washer 25 is positioned on stud 12 and a jumper or conductor strip 26 is positioned on stud 13. Strip 26 serves to connect stud 13 to a fixed contact 27 which is rigidly and insulatedly mounted in the disc 10. The lower ends of studs 12 and 13 and contact 27 are peened to rivet the assembly securely together. This arrangement of structure is clearly illustrated in Figure 5 of the drawings.

The free end of the spring element 11 is provided with a contact 28 which cooperates with the fixed contact 27.

The switch formed by the fixed contact 27 and the movable contact 28 carried by the spring 11 is normally closed and is adapted to be opened by displacement of the pusher rod 9 which is actuated by the thermostat as hereinbefore described. For this purpose it is found convenient to insert the threaded support member 10 within the housing 1 so that the contacts 27 and 28 lie on the side of the disc 10 remote from the thermostat. To enable the pusher rod to actuate the spring element 11 to move the movable contact 16 away from the fixed contact 17, the disc 10 is provided with a central opening 29 through which the rod 9 extends. To avoid conductive contact between the spring element 11 and the pusher rod 9, the latter is provided with a bore in the end which passes through the central opening 29 and in which is mounted an insulating plug 30 which serves to make actual contact with the spring 11.

When the threaded body 10 is in a position whereby the insulating element 30 of the pusher rod 9 is in engagement with the spring 11, heating of the thermostat bulb 7 will cause the liquid therein to expand and this in turn will effect a displacement of the pusher rod 9 and will cause the spring 11 to be displaced to separate the contacts 27 and 28. By adjusting the axial position of the body 10 and the spring 11 in the housing 2 relative to the end of the pusher rod, the separation of the contacts 27 and 28 will take place at various predetermined temperatures. To return the bellows to its normal position upon cooling of bulb 7, a spring 31 is provided.

The threads 2 in the inner surface of the housing 1 extend inwardly of the tube a sufficient distance from the upper end thereof to enable the position of the washer 10 to be adjusted in the housing to obtain separation of the contacts within in a temperature range through which the device is to be used.

Since the thermostatically actuated switch in accordance with the present invention will be subjected to mechanical shocks in use, the position of the body 10 within the housing may be accidentally varied. To overcome this, the present invention provides means carried by the body 10 for frictionally engaging the threads 2 and thereby frictionally locking the body 10 in adjusted positions within the housing 1. The frictional means found to be particularly suitable is, as shown in the several figures of the drawings, in the form of the fiber plate or washer 14.

This plate is made to project beyond the peripheral edge of body 10 and is larger than the internal threaded portion of the housing 1, so that when the body 10 is screwed into the housing 1, partial threads will be pressed into the projected portions of the plate 14. This puts a heavy drag or friction on the turning of the body 10 so that it will remain wherever it is set. No amount of use or vibration will cause the body 10 to be accidentally rotated within the housing. This friction lock enables the body 10 to be more easily adjusted in a manner which is quicker and easier than if set screws were used to hold the body in adjusted position.

In actual use, the plate 14 is made in the form of a disc with three lugs spaced substantially 90° apart and projecting beyond the peripheral portion of the body 10. It will be noted that by providing only three lugs 32 spaced 90° apart there is no projecting lug on one side of the plate 14. The effect of this construction is for the projecting lugs 32 to force the threaded body 10 on the side where there are no lugs 32 against the threads 2 within the housing, thus locking the tightly pressed threads of the body 10 with the threads 2 of the housing under tension. The effect of the lugs 32 into which the threads of the housing cut is to place considerable friction on these parts which serve to prevent rotation of the body 10 within the housing 1. This construction enables the body 10 to be adjusted to any desired position within the housing 1 and be frictionally retained in the adjusted position.

Although three lugs 32 positioned 90° apart are effective, it is not indispensable to the present invention as a locking action will be provided regardless of the number of lugs, and as a matter of fact even when the engagement between the edge of plate 14 and the threads of the housing 1 is continuous throughout the circumference of the plate.

Figure 8:
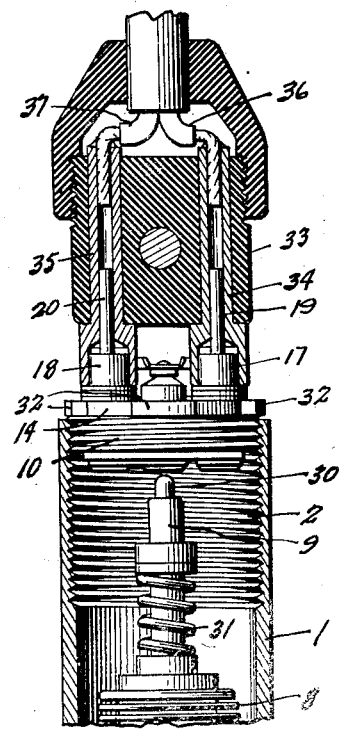
Figure 8 is a fragmentary sectional view of the wrench and thermostat taken on line 8—8 of Figure 7.
Figure 7:
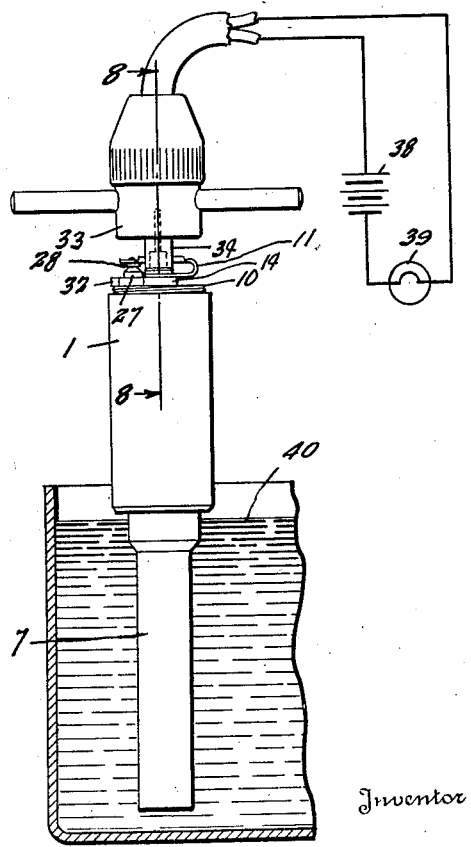
Figure 7 is a diagrammatic representation of a thermostatic switch constructed in accordance with the present invention immersed in a bath and having associated therewith an adjusting wrench provided with a testing circuit.

In assembling the body 10 within the housing 1, the body is screwed into the same by means of wrench 33 which is provided with sockets to receive the upper portions of the studs 12 and 13. As illustrated in Figure 8 of the drawings the wrench 33 comprises in insulated body member having tubes 34 and 35 positioned therein to receive the upper parts 19 and 20 of the studs 12 and 13. The lower ends of the tubes 34 and 35 are enlarged to form sockets to receive the heads 17 and 18 of the studs 12 and 13.

The tubes 34 and 35 are constructed of metal and are connected to conductors 36 and 37 which form part of a test circuit including a battery 38 and a lamp 39. In the form of switch illustrated in the drawings, the contacts 27 and 28 are normally engaged and are adapted to be opened when the temperature of the electrolyte is sufficient to cause the thermostat to operate. Thus, the test circuit including the battery 38 and 39 will be completed through the tubes 34 and 35 and the contacts 27 and 28 of the switch. In adjusting the position of body 10, the bulb 7 is immersed in the test bath 40 which is at the temperature at which the switch is open and body 10 is moved into the housing 1 until the light 39 is extinguished by reason of the element 30 engaging the spring 11 and causing the contacts 27 and 28 to be separated.

After the body 10 is adjusted to the proper position within the housing 1 to cause the switch to operate at the desired temperature, conductors 41 which are part of the charging circuit are soldered to the terminals 19 and 20 on the upper ends of the studs 12 and 13 and the cable containing the conductors 41 is passed through a strain relief 42 which is mounted in an opening within a closure 43 which is secured in place on the upper end of the housing 1. The closure 43 may be soldered or otherwise secured to the housing 1 to maintain a tightly closed container.

Since the thermostatic switch in accordance with the present invention is to be used by insertion within the filler opening of a battery, the bulb 7 must be encased in a sheath 44 of material which has both heat conducting and acid resisting properties. For this purpose, it is found that the sheath 44 may be constructed of an alloy containing approximately 6% antimony and the balance lead.

To protect the other parts of the thermostat including the housing 1, a sheath 45 of rubber is snugly fitted over the entire housing 1 and the closure element 43. The lower end of the rubber sheath 45 extends down over a portion of the lead sheath 44 which encases the bulb 7. The rubber sheath 45 is formed of a size so that it will snugly fit the housing 1 and associated parts and is stretched over the housing by means of a special tool which is not part of the present invention. Before the rubber sheath is entirely collapsed to snugly grip the thermostat, an acid-proof rubber cement is forced between the sheath and the thermostat so that at the juncture of the cable 41, strain relief 42, and closure 43, a seal 46 is provided. Also, at the juncture of the lower end of the housing 1 and the lead sheath 44, another seal 47 is provided. These seals are so formed as to prevent any acid reaching the metal parts of the thermostat and its housing.

A rubber baffle 48 is mounted over the lower end of the rubber sheath and is retained in place by a bead 49. This baffle will prevent excessive spraying of acid from the filler opening in which the thermostat bulb 7 is inserted during charging of the battery.

Instead of rubber, other suitable plastic material having acid resisting properties may be used.

From the foregoing description it will be appreciated that the present invention provides a thermostat construction which avoids the prior art disadvantages and which is easily made and adjusted.

I claim:

1. A control switch comprising a housing element having a bore therein the inner cylindrical surface of which is threaded, a support element having a threaded external cylindrical surface threadedly mounted in said bore, a switch assembly having a movable member and carried by said threaded support element, an actuating member carried by said housing for actuating the movable member of said switch assembly, said threaded support element being rotatably adjustable in said threaded bore for axial displacement relative to said actuating member, and means carried by one element and frictionally engaging the threaded surface of the other to frictionally restrain said elements against relative movement.

2. A control switch comprising a housing having a threaded bore therein, a threaded support threadedly mounted in said bore, a switch assembly having a movable element and carried by said threaded support, an actuating element carried by said housing for actuating the movable element of said switch assembly, said threaded support being rotatably adjustable in said threaded bore for axial displacement relative to said actuating element, and means carried by said support for frictionally engaging the threaded surface of the bore to retain the support in adjusted positions.

3. A control switch comprising a housing having a threaded bore therein, a threaded support threadedly mounted in said bore, a switch assembly having a movable element and carried by said threaded support, an actuating element extending into said bore for actuating the movable element of said switch assembly, said threaded support being rotatably adjustable in said threaded bore for axial displacement relative to said actuating element, and lugs of friction material carried by and projecting beyond the threaded surface of the support for frictionally engaging the threaded surface of the bore to retain the support in adjusted positions.

4. A control switch comprising a housing having a threaded bore therein, a threaded support threadedly mounted in said bore, a switch assembly having a movable element and carried by said threaded support, an actuating element extending into said bore for actuating the movable element of said switch assembly, said threaded support being rotatably adjustable in said threaded bore for axial displacement relative to said actuating element, and a plate of friction material carried by said support and having portions projecting beyond the threaded surface of the support for frictionally engaging the threaded surface of the bore to retain the support in adjusted positions.

5. A control switch comprising a housing element heaving a bore therein the inner cylindrical surface of which is threaded, a support element having a threaded external cylindrical surface threadedly mounted in said bore, a switch assembly having a movable element and carried by said threaded support, a thermostat carried by said housing and having a temperature responsive displaced member for actuating the movable element of the switch, said threaded support being rotatably adjustable in said threaded bore for axial displacement relative to said actuating element, and means carried by one element and frictionally engaging the threaded surface of the other to frictionally restrain said elements against relative movement.

6. A thermostat switch for use in battery charging comprising a tubular housing element, a thermostat having a body portion mounted in the housing and an extension projection beyond the end of the housing for insertion in the electrolyte of a battery to be charged, a movable member on said thermostat extending into said tubular housing, the inner surface of said housing element being threaded, a support element heaving a threaded external cylindrical surface threadedly mounted in the threaded portion of said housing element, a switch assembly having a movable member and carried by said threaded support element, said threaded support element being rotatably adjustable in said threaded bore for axial displacement of the latter relative to said actuating member, and means carried by one element and frictionally engaging the threaded surface of the other to frictionally restrain said elements against relative movement.

7. A thermostat switch for use in battery charging comprising a tubular housing element, a thermostat having a body portion mounted in the housing and an extension projection beyond the end of the housing for insertion in the electrolyte of a battery to be charged, a movable member on said thermostat extending into said tubular housing, the inner surface of said housing element being threaded, a support element having a threaded external cylindrical surface threadedly mounted in the threaded portion of said housing element, a switch assembly having a movable member and carried by said threaded support element, said threaded support element being rotatably adjustable in said threaded bore for axial displacement relative to said actuating member, and means carried by said support element for frictionally engaging the threaded surface of the housing element to retain the support in adjusted positions.

8. A thermostat switch for use in battery charging comprising a tubular housing element, a thermostat having a body portion mounted in the housing and an extension projection beyond the end of the housing for insertion in the electrolyte of a battery to be charged, a movable member on said thermostat extending into said tubular housing, the inner surface of said housing element being threaded, a support element having a threaded external cylindrical surface threadedly mounted in the threaded portion of said housing element, a switch assembly having a movable member and carried by said threaded support element, said threaded support element being rotatably adjustable in said threaded bore for axial displacement relative to said actuating member, and lugs of friction producing material carried by and projecting beyond the threaded surface of the support for frictionally engaging the threaded inner surface of the housing element to retain the support in adjusted positions.

9. A thermostat switch for use in battery charging comprising a tubular housing element, a thermostat having a body portion mounted in the housing and a bulb projecting beyond the end of the housing for insertion in the electrolyte of a battery to be charged, a movable member on said thermostat extending into said tubular housing, the inner surface of said housing element being threaded, a support element having a threaded external cylindrical surface threadedly mounted in the threaded portion of said housing element, a switch assembly having a movable member and carried by said threaded support element, said threaded support element being rotatably adjustable in said threaded bore for axial displacement relative to said actuating member, and a plate of friction material carried by said support and having portions projecting beyond the threaded surface of the support for frictionally engaging the threaded inner surface of the housing to frictionally retain the support in adjusted positions.

10. An apparatus for adjusting a control switch having a housing element provided with a bore therein the inner cylindrical surface of which is threaded, a support element having a threaded external cylindrical surface threadedly mounted in said bore, a switch assembly having fixed and movable contact members and a terminal for each contact member carried by said support element, an actuating member carried by said housing for actuating the movable member of said switch assembly, said threaded support element being rotatably adjustable in said threaded bore for axial displacement relative to said actuating member, means carried by one element and frictionally engaging the threaded surface of the other to frictionally restrain said elements against relative movement, said apparatus comprising a tool having insulated contacts for engaging the terminals on said support element for adjusting the position of the latter, and means for indicating whether the contact members are closed or separated.

11. An apparatus for adjusting a control switch having a housing element provided with a bore therein the inner cylindrical surface of which is threaded, a support element having a threaded external cylindrical surface threadedly mounted in said bore, a switch assembly having fixed and movable contact members and a terminal for each contact member carried by said support element, an actuating member carried by said housing for actuating the movable member of said switch assembly, said threaded support element being rotatably adjustable in said threaded bore for axial displacement relative to said actuating member, means carried by one element and frictionally engaging the threaded surface of the other to frictionally restrain said elements against relative movement, said apparatus comprising a tool having insulated contacts for engaging the terminals on said support element for adjusting the position of the latter, and a circuit including a source of electrical energy and an electric indicator connected across said insulated contacts and adapted to be completed by the closure of said contact members.

12. An apparatus for adjusting a control switch having a housing element provided with a bore therein the inner cylindrical surface of which is threaded, a support element having a threaded external cylindrical surface threadedly mounted in said bore, a switch assembly having fixed and movable contact members and a terminal for each contact member carried by said support element, an actuating member carried by said housing for actuating the movable member of said switch assembly, said threaded support element being rotatably adjustable in said threaded bore for axial displacement of the latter relative to said actuating member, means carried by one element and frictionally engaging the threaded surface of the other to frictionally restrain said elements against relative movement, said apparatus comprising a tool having insulated contact sockets for receiving the terminals on said support for adjusting the position of the latter, and means for indicating whether the contact members are closed or separated.

13. A temperature controlling device for use in battery chargers, said device comprising a housing open at both ends, a thermostatic member having a body portion secured in one of said open ends, a bulb containing an expansible fluid formed on one side of said member and extending beyond said housing for insertion into the electrolyte of a battery under charge, a switch unit having a fixed and movable contact disposed in the other end of said housing, said contacts being normally closed, actuating means formed on the other side of said member and extending into said housing to a position adjacent said movable contact, said switch being movable axially in said housing for varying the position of the movable contact relative to said actuating means to thereby control the temperature at which a battery may be charged, and means carried by said switch for frictionally engaging the housing for retaining the switch in its adjusted position.

BENJAMIN F. W. HEYER.